Jan. 8, 1952     H. KOLZING     2,581,542
ROTARY BALER
Filed May 1, 1946     6 Sheets-Sheet 1

Jan. 8, 1952    H. KOLZING    2,581,542
ROTARY BALER
Filed May 1, 1946    6 Sheets-Sheet 4

Inventor:
Heinz Kolzing.
By Paul O. Pippel,
Atty.

Jan. 8, 1952          H. KOLZING          2,581,542
ROTARY BALER Filed May 1, 1946                      6 Sheets-Sheet 6

Inventor:
Heinz Kolzing.
By Paul O. Pippel
Atty.

Patented Jan. 8, 1952

2,581,542

UNITED STATES PATENT OFFICE 2,581,542

ROTARY BALER

Heinz Kolzing, Shelbyville, Ill., assignor to International Harvester Company, a corporation of New Jersey Application May 1, 1946, Serial No. 666,351

14 Claims. (Cl. 100—1)

1

This invention relates to a mechanism for compressing vegetation such as cotton, hay, straw, or the like, and more particularly to a rotary hay baler. More specifically it relates to an improvement in a rotary baling mechanism of the type disclosed in the patent to Ummo F. Luebben, 2,336,491, patented December 14, 1943.

In the Luebben patent the baling mechanism is moved through the field while a conveyer picks up the stalks or hay and carries them to a drum roller above which is mounted a compressing roller under spring tension. The hay is fed between the rollers and compressed into a flat mat whereupon it then enters into a baling space or bight formed by a lower and an upper baling belt, said belts continuously moving in opposite directions with respect to one another. The friction of the belts and the movement thereof causes the mat of hay to be rolled into a compact cylindrical mass. When the cylindrical mass reaches a predetermined size, an automatic mechanism stops the conveyer belt and the forward movement of the baler mechanism is halted. A twine wrapping means is then automatically set into motion which spirally wraps twine around the bale of hay. After the twine has been wrapped around the bale, an automatic discharge means is set into operation. The bale is discharged from the mechanism and the operator manually ties or knots the twine which has been wrapped around the bale. The mechanism then returns to its starting operation, again starts its forward movement, and the cycle of operation is repeated. This type of machine must be stopped when the bale has reached a certain size and is ready for discharge since continuous feeding of the conveyer would result in the feeding of stray portions of hay to the cylindrical mass of the bale. These stray portions of hay would have their ends protruding from the bale and would possibly cause unrolling of the entire mass as the bale is discharged to the ground.

In order to expedite and increase the speed of the baling operation, it is applicant's intention to provide a baling machine having a hay gathering means which need not be halted when the bale is ready for discharge or is being wrapped. Continuous forward movement of the machine will permit the continuous gathering of hay so that upon discharge of the formed bale, a sufficient reservoir of hay is ever present and ready to be immediately fed into the mechanism for the formation of a new bale. Thus the maximum efficiency of the baling mechanism is accomplished without any interval or time lapse occasioned by stopping of the gathering means.

2

In order to make full use of the maximum efficiency so derived it is also necessary and desirable to provide an automatic tying or knotting means, in addition to a twine wrapping mechanism for the bale. Such a mechanism is part of applicant's invention. The bale is automatically discharged from the rolling or forming means onto a platform whereupon a twine wrapping means is set into motion. When the bale is wrapped with twine, a knotter of conventional construction ties the twine and the bale is automatically discharged to the ground. Thus the complete cycle of operation from gathering to formation of the bale and subsequent wrapping and tying is completely and automatically accomplished without the necessity of the operator stopping the machine or performing any manual adjustments or operations.

The prime object of this invention, therefore, is to provide an improved and more efficient type of rotary baling machine.

Another object is to provide a rotary baling machine which contains a mechanism permitting continuous forward movement of the machine and gathering mechanism while the bale is being formed, wrapped with twine and discharged.

Another object of the invention is to provide a rotary hay baler having a continuously running pick-up roller and conveyer which is gathering and conveying hay while a cylindrical bale is being formed and discharged from the baler.

A further object is to provide a rotary hay baler having a continuously running pick-up roller and conveyer which is gathering and conveying hay while a cylindrical bale is being wrapped with strand means, tied and then discharged.

A further object is to provide a rotary hay baler which will collect a reservoir of hay that can immediately be fed to the baling mechanism upon discharge from said mechanism of a completely formed bale.

A further object is to provide an automatically operative wrapping and tying means for a rotary baling machine.

Another object is to provide a wrapping, tying and discharge means for a hay baler, said means being set into operation upon the arrival of a compressed mass of hay.

A still further object is the provision of a completely automatic rotary baling machine adapted to be moved and operated with a tractor, said rotary baling machine being operable to form, tie and discharge bales in a continuous manner without the operator stopping said machine or leaving said tractor to perform any manual operations.

Numerous other objects and advantages of the invention will become apparent from the following detailed description when read with the accompanying drawings, in which.

Referring to the drawings in detail, a rotary baling mechanism or machine is generally designated by the numeral 10, which has at its forward portion a material gathering means 11 and at its rearward portion a twine wrapping, knotting and discharge means 12.

*The baling mechanism*

Figure 8:
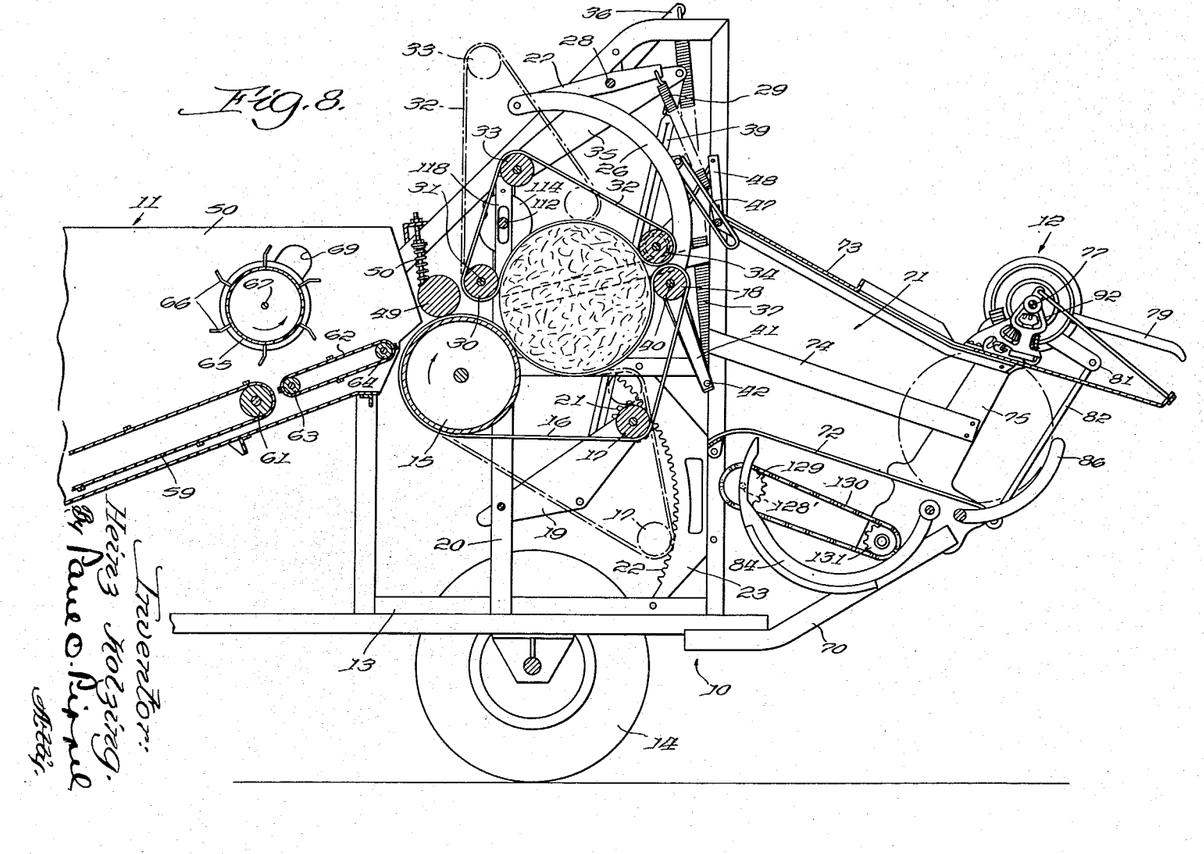
Figure 8 is a sectional view of a rotary baling machine taken along the line 8—8 of Figure 2.
Figure 9:
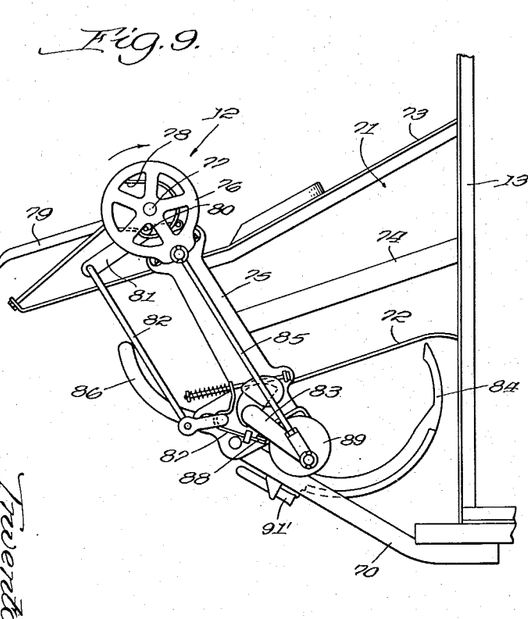
Figure 9 is a side elevational view of a twine wrapping, knotting and discharge means for a rotary baling machine.

The rotary baling mechanism 10 includes a vertically extending box-like frame 13 which is carried by a pair of ground wheels 14. A substantially large diameter drum roller 15 is transversely mounted on the frame 13. A plurality of lower baling belts 16, as best shown in Figure 8, are driven by the drum roller 15 and extend around a lower tension roller 17 and a lower trip roller 18. The lower tension roller 17 extends transversely of the frame 13 and is connected to a pair of lower tension arms 19. The lower tension arms 19 are pivotally connected to a supporting member 20 of the frame 13.

A pair of pinions 21 are connected to the ends of the tension roller 17 and are in engagement with teeth 22 of a pair of arcuately shaped and oppositely disposed rack bars 23 which are rigidly secured to the frame 13. A tension member or braking means 24 is mounted at one end of the tension roller 17 and is adapted to regulate the tension of the lower baling belts 16. An adjustable wing nut 25 is provided for regulating the tension member 24 to any predetermined desired tension. The Ummo Luebben patent, entitled "Rotary Baler," No. 2,096,990 fully discloses and describes a similar braking means in detail.

Figure 3:
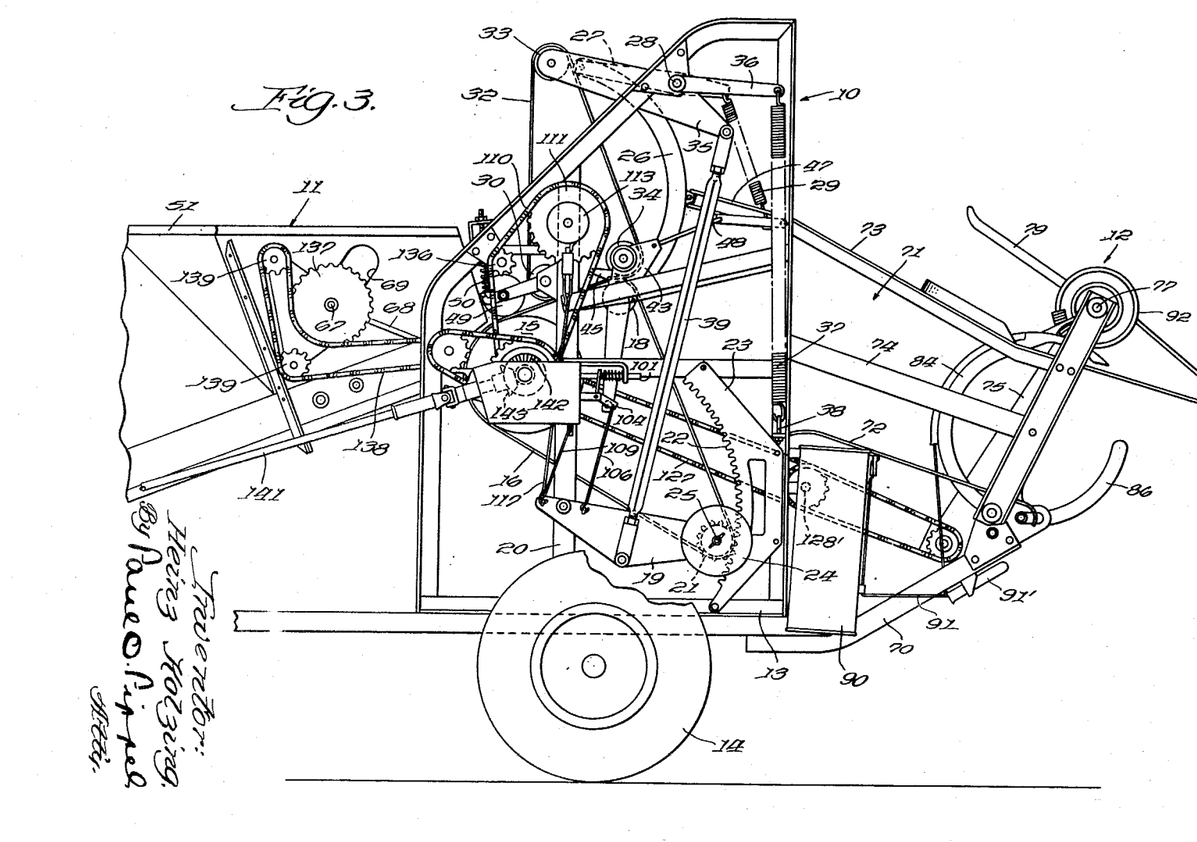
Figure 3 is an enlarged elevational view of the left side of a rotary baling machine, showing the baling and tying mechanism.

Referring particularly to Figures 3 and 8, the trip roller 18 is pivotally connected to the lower ends of a pair of hanger members 26, arcuate in shape, and positioned opposite one another at each side of the frame. The hanger members 26 are pivotally connected at their upper ends to a pair of hanger levers 27 which are swingable about a shaft 28 mounted on the frame 13. A pair of springs 29 are connected at one end to the hanger levers 27 and at the other end to the frame 13, said springs urging said hanger levers in a clockwise manner to retain the hanger members 26 in the position indicated in Figure 3.

An upper drive roller 30 is keyed to a transversely extending shaft 31 as best shown in Figure 8. The drive roller 30 drives an upper baling belt 32 which extends about an upper tension roller 33 and an upper trip roller 34. The tension roller 33 is pivotally connected to upper tension arms 35 oppositely disposed. The upper tension arms are swingably connected to the shaft 28. A pair of levers 36 are keyed to the shaft 28 and have at their ends springs 37 which are connected to the frame as indicated at 38. The function of these springs 37 is to return the upper tension roller 33 from the position indicated in Figure 8 to the position shown in Figure 3. A pair of connecting rods 39 are connected to the upper tension arms 35 and the lower tension arms 19. The function of the connecting rods 39 is to transmit movement of the upper tension arms 35 to the lower tension arm 19 and the springs 37 are thus effective on the lower tension arms as well as the upper.

Figures 5, 6, 7:
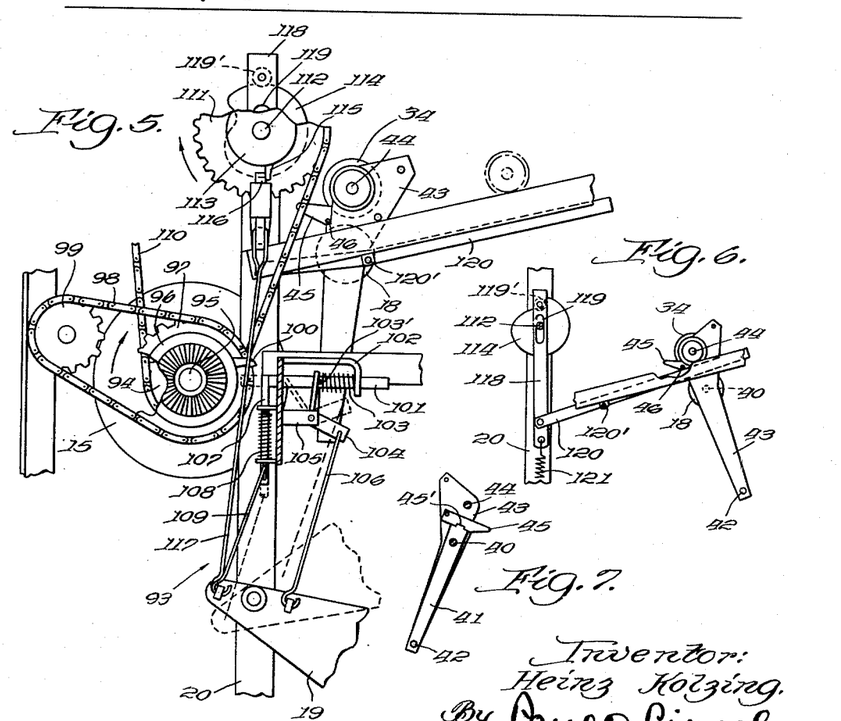
Figure 5 is an enlarged side elevational view of a portion of the rotary baling machine, showing in detail an automatic bale discharge mechanism and associated parts.
Figure 6 is a detail elevational view of a bale tripping or discharge mechanism and an actuating means therefor.
Figure 7 is a detail view of a pair of tripping arms.

As best shown in Figures 5, 6 and 8, the lower trip roller 18 is idly mounted on a shaft 40 which is keyed to the hanger members 26 and to oppositely positioned lower trip arms 41. The trip arms 41 are connected as at 42 to oppositely disposed upper trip arms 43.

The upper trip roller 34 is idly rotatable about a shaft 44 which is keyed to the upper trip arms 43. The trip arms 41 and 43 are free to pivot clockwise or counterclockwise with respect to each other when not normally held in the locked position, indicated in Figure 7, by means of the trip lever 45 which engages a projection 45' on the lower trip arm 41. A transversely extending pin or projection 46 is connected to the trip lever 45.

As best shown in Figures 3 and 8, oppositely disposed links 47 limit the forward movement of the hanger arms 26 and the trip roller 18. Linkage mechanism 48 limits the forward movement of the trip roller 34. A compressing roller 49 is positioned above the drum roller 15 and is adjustably held against said roller by a spring or tension means 50 which contains adjustable means for varying the tension of said compression roller. The rollers 15 are effective to compress the vegetation and feed the same to the baling mechanism 10.

*The material gathering means*

Figure 4:
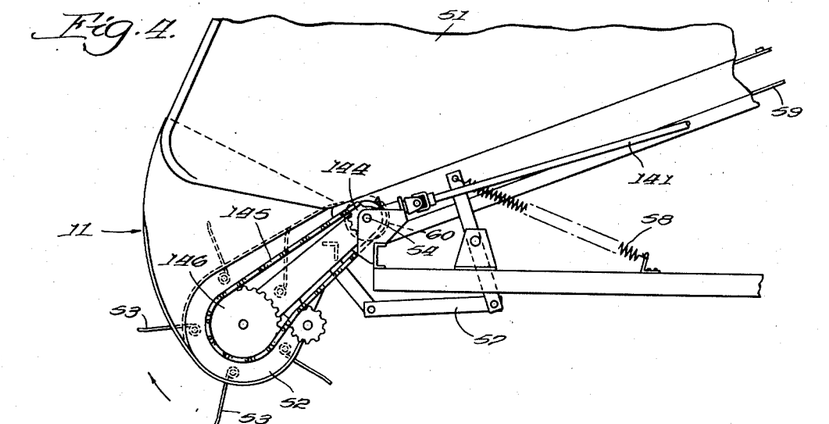
Figure 4 is a side elevational view of the forward portion of a rotary baling machine, showing a material gathering and conveying means.

As best shown in Figures 1, 2, 4 and 8, the material gathering means 11 includes a conveyer trough 51 which has at its foremost end a pick-up roller 52 having a plurality of pick-up teeth 53. The roller 52 is swingable about a shaft 54 and the working position thereof is adjustable from the ground by means of a lever and detent mechanism 55 which is connected to the pick-up roller 52 by means of linkage 56. As best shown in Figure 4, the linkage 57 and the spring 58 normally aid to lift the roller 52 into its raised position when the detent mechanism 55 is moved.

A lower conveyer belt or feeding means 59 is positioned for rearward longitudinal movement within the conveyer trough 51. The belt 59 rotates about a lower conveyer roller 60 and an upper conveyer roller 61.

An upper conveyer belt 62 is positioned for rearward longitudinal movement and is trained around conveyer rollers 63 and 64 as best shown in Figure 8.

A feed roller or supply means 65, having a plurality of teeth 66, is mounted for rotation about a shaft 67. The feed roller 65 is of the floating type and the ends of the shaft 67 are connected to oppositely disposed arms 68 which are pivotally connected (not shown) to the frame 13 in a conventional manner. The shaft 67 is free to move vertically within the slots 69 formed in the side walls of the trough 51.

The twine wrapper, knotting and discharge mechanism

The twine wrapping, knotting and discharge means 12 is mounted at the rear of the baling machine and comprises a supporting structure 70 which is rigidly connected to the frame 13. A bale receiving trough 71 is formed by a platform 72, a deck 73, and side guide members 74.

Figures 2, 11:
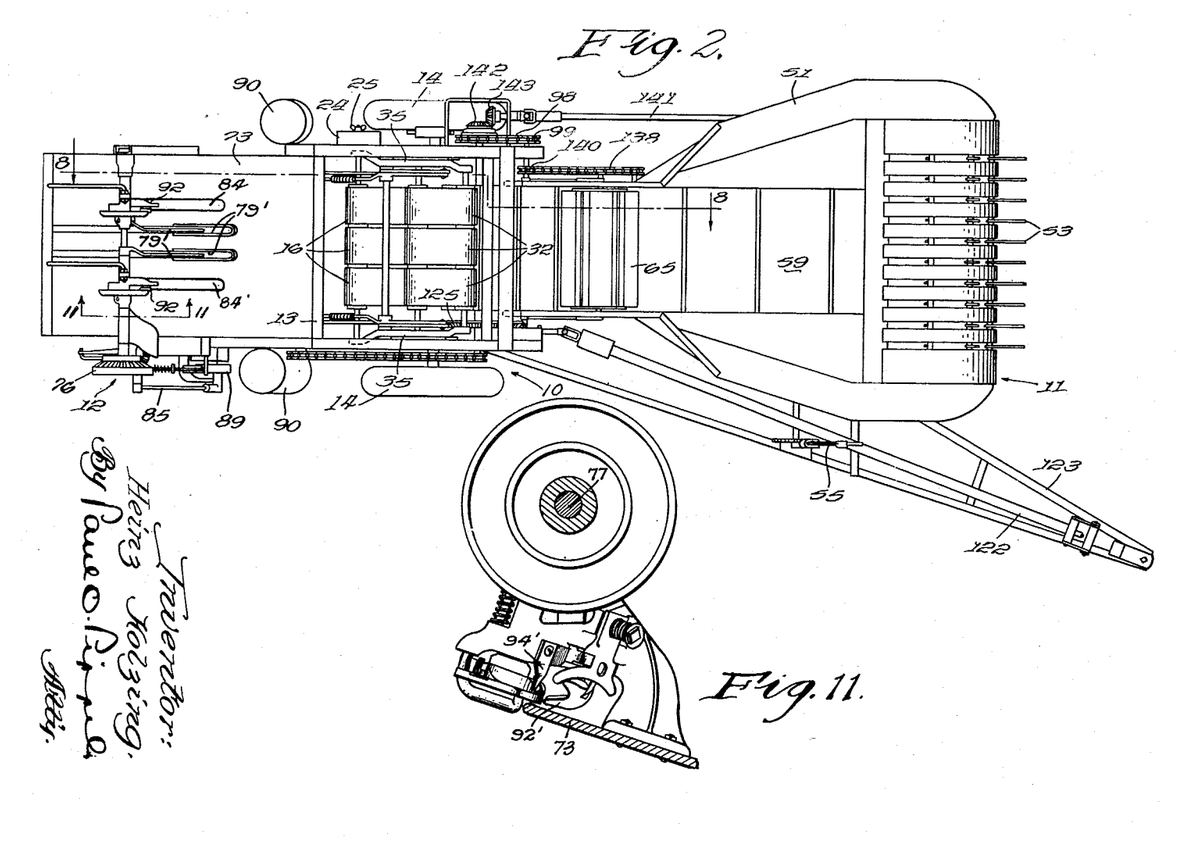
Figure 2 is a plan view of the same.
Figure 11 is a sectional view taken substantially along line 11—11 of Figure 2.

Positioned at the rearmost portion of the bale receiving trough is a binding or twine wrapping mechanism of conventional construction and of a type which is well known to those skilled in the art. This type of mechanism is described in detail and shown in the patent to B. R. Benjamin, No. 994,711, of June 13, 1911. As best shown in Figures 2, 8, 9, and 10 it consists generally of a hollow head piece 75 which supports a gear wheel 76 mounted for rotation on a shaft 77 extending transversely of the mechanism. A cam track 78 is carried by the wheel 76 and discharge arms 79 are keyed to the shaft 77. The discharge arms 79 may be rotated through slots 79' provided in the deck 73. The slots 79' are shown in Figure 2. A roller 80 is journaled in the cam track 78 and is connected to a compressor lever 81 which in turn is connected to a link 82.

A crank arm 83 is pivoted at the lower portion of the head piece 75 and is operably connected to a pair of needle arms 84. A pitman 85 connects the gear wheel 76 and the crank arm 83. Movement of the gear wheel 76 is thus transmitted to the needle arms 84 which are adapted to rotate and extend through a pair of slots 84' in the deck 73.

Figure 10:
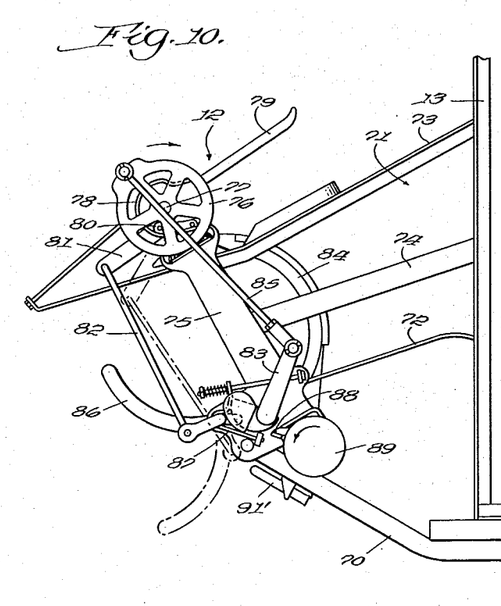
Figure 10 is a view similar to Figure 9, showing an operating position of the twine wrapping, knotting and discharge means.

A trip arm 86 is provided at the end of the platform 72 and is adapted to move in a counterclockwise position as shown in Figure 10. Movement of the trip arm 86 in this manner disengages a latch 87 which normally engages a dog 88 of a clutch 89, this type of mechanism being well described in the above-mentioned patent.

Oppositely positioned twine tanks 90 supply twine 91 to a pair of horns or tubes 91' which are positioned to guide the twine into the hollow portions of the needle arms 84.

A pair of knotters or tying mechanisms 92 of a well known and conventional construction are actuated by the shaft 77 and transversely positioned thereon. These knotters are adapted to cooperate with the needle arms 84 for knotting the twine and cutting it off. Figure 11 shows a side elevational view of one type of knotter that may be used. The knotters 92 consists of a conventional mechanism and include a knotter hook 92' and a twine cut-off knife 94'. The knotter is well described and shown in the patent to B. R. Benjamin, No. 865,754, patented September 10, 1907, and need not be further described.

The automatic baling release mechanism

In order to provide for the shutting off of the hay feeding mechanism and to provide for the release of the bale upon the attainment thereof at a predetermined diameter, an automatic baling release mechanism 93 is employed.

As best shown in Figure 5, this mechanism consists of a constantly rotating gear wheel 94 keyed to a shaft 95 which also supports the drum roller 15. A clutch 96 also is keyed to the shaft 15 and is normally in engagement with a sprocket 97 which through a chain 98 drives a sprocket 99 for driving the conveyer roller 64.

The clutch 96 is of a conventional release type construction and can be released upon engagement of a dog 100 with a pin 101. This engagement thereby releases the clutch 96 from driving engagement with the sprocket 97 thus stopping the conveyer 62.

The pin 101 is slidably positioned in a bracket 102. A spring 103 presses against a stud 103' transversely driven through the pin 101, and urges said pin 101 forwardly against a bell crank 104 pivotally connected to a brace 105. The bell crank 104 is held against counterclockwise movement, as urged by the spring 103, by means of a link 106 connected to the lower tension arm 19.

The pin 101 is further locked against forward movement by a slidable latch 107 which is normally in a locked or up position as urged by a spring 108. In this up position the latch 107 is in engagement with the pin 101. The latch 107 may be forced downwardly by means of a link 109 connected to the lower tension arm 19.

A chain 110 is in engagement with the constantly rotating gear wheel 94 and a sprocket 111, mounted for rotation on a shaft 112 pivoted on the supporting member 20. The sprocket 111 is constantly rotating and is adapted to actuate a clutch 113 for rotating a cam 114 pivotally and freely connected to the shaft 112.

The clutch 113 is of conventional construction and will impart movement to the cam 114 upon release of a dog 115 from a release member 116. The release member 116 is normally in engagement with the dog 115 and can be disengaged by the downward movement of a rod 117 connected to the lower tension arm 19.

A slide bar 118 having a slot 119 is vertically slidable with respect to the shaft 112. A roller 119' is pivotally mounted at the upper end of said bar for engagement and travel around a cam 114. The slide bar 118 is operatively connected to a lever 120 which is pivotally mounted as indicated at 120' to a portion of the frame as best shown in Figures 5 and 6. The pivotal movement of the lever 120 will cause the end of said lever to engage the pin 46 for lifting the trip lever 45. A spring 121 normally urges the slide bar 118 downwardly.

The driving mechanism

Power for the baling machine and its associated parts is derived from a power shaft 122 conventionally coupled to the power take-off of a tractor not shown. A draw-bar member 123 is connected to the tractor for moving the machine.

Figure 1:
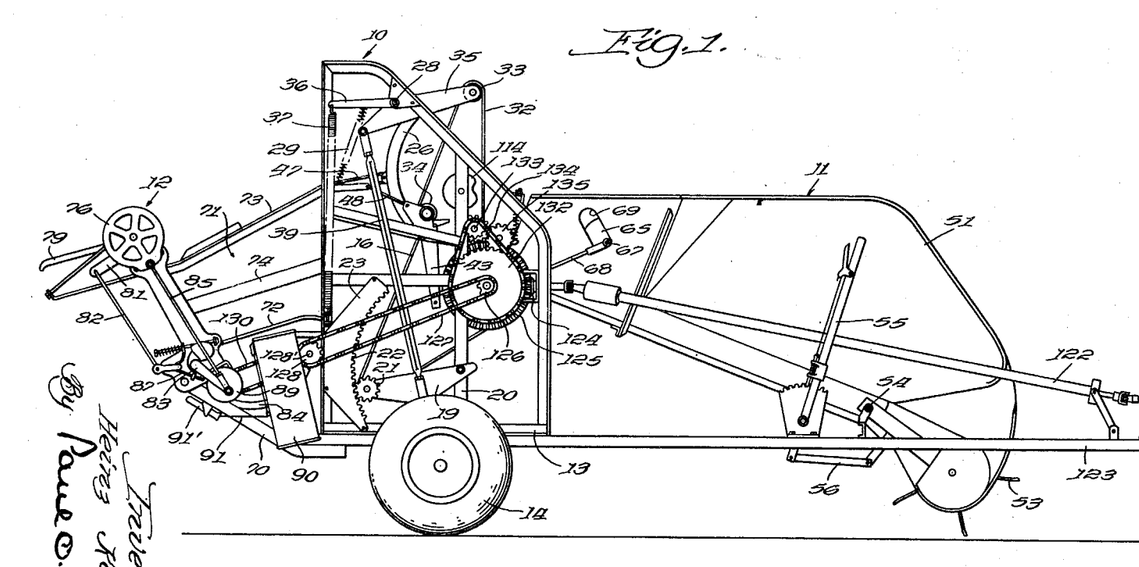
Figure 1 is an elevational view showing the right side of a rotary baling machine having a material gathering means and a bale wrapping and tying means.

The power shaft 122, by means of a bevel gear 124, drives a gear 125 for driving the roller 15. A sprocket 126 drives a chain 127 for driving a sprocket 128 as shown in Figure 1. The sprocket 128, by means of a cross shaft 128', drives a sprocket 129 as shown in Figure 8, for driving a chain 130 connected to a sprocket 131 which actuates the twine wrapping, knotting and discharge mechanism 12.

The gear 125 drives a sprocket 132 which drives the upper drive roller 30 by means of a sprocket 133 and a driving chain 134. The compression roller 49 is driven by a gear 135 having teeth meshing with the sprocket 132.

As previously described, the automatic baling release mechanism 43 and the upper conveyer 62 are driven by the shaft 95 on which are mounted the gear wheel 94 and the sprocket 97. An idler sprocket 136 guides the chain 110 as best indicated in Figure 3. The feed roller 65, keyed to the shaft 67, is driven by a sprocket 137 and a drive chain 138 guided by idler sprockets 139. The drive chain 138 is driven by a sprocket 140, as shown in Figure 2, which in turn is driven by the sprocket 99.

As best shown in Figures 3, 4, and 5, a drive shaft 141 is driven by a gear 142 by means of a bevel gear 143. The drive shaft 141 drives a sprocket 144 which is keyed to the shaft 54 and which rotates the lower conveyer belt 59 by means of the conveyer roller 60. A chain 145 driven by the sprocket 144 drives a sprocket 146 which drives the roller 52 in a clockwise direction.

The operation

The rotary baling machine 10 is rolled through a field by means of a tractor connected to the draw-bar 123. The power shaft 122 transmits power from the tractor to the rotary baling mechanism 10, the material gathering means 11, and the twine wrapping and discharge means 12 as previously described. The pick-up roller 52 is rotating in a clockwise direction as viewed in Figure 4 and is picking up vegetation such as hay or the like, said vegetation being carried to the conveyer belt 59. The conveyer belt 59 is moving rearwardly and the vegetation is carried to the feed roller 65 which is rotating in a counter-clockwise direction as viewed in Figure 8 for feeding hay onto the upper conveyer 62. The hay leaves the upper conveyer 62 and enters between the drum roller 15 and the compression roller 49. At this point the hay is compressed into a mat-like mass which enters into the space formed between the upper baling belt 32 and the lower baling belt 16. As best shown in Figure 8, the upper baling belt is moving in a forward direction and the lower baling belt is moving in a rearward direction.

Due to the movement of the belts the mat-like mass starts to form a cylindrical mass or bale. As the bale grows in size the upper tension roller 33 and the upper tension arm 35 are moved downwardly and the lower tension roller 17 and the lower tension arm 19 are moved upwardly. As the lower tension roller 17 moves upwardly, the braking means 24 is rotated by means of the rack 22 and the mechanism within the braking means 24 causes tensioning of the lower baling belt which in turn is transmitted to the bale and regulates the density thereof. As the upper and lower tension arm 35 and 19 are moved the spring 37 is expanded and provides means for returning these members to their normal position when the bale is ejected or released.

As the bale grows in size, the hanger members 26 are rotated from the position shown in Figure 3 to the position shown in Figure 8. The lower trip roller 18 and the upper trip roller 34 are thereupon also moved into their extreme rearward position, the lower trip arms 41 and the upper trip arms 43 being locked together in the position shown in Figure 7.

When the bale has reached its predetermined diameter and the lower tension arm 19 has moved to the dotted line position shown in Figure 5, the release mechanism is ready to be actuated. At this point the upper conveyer 62 and the feed roller 65 are still operating. The gear wheel 94 is constantly driving the sprocket 11 freely on the shaft 112. When the lower tension arm 19 has reached the limit of its up position the link 106 is pushed upwardly and rotates the bell-crank 104 away from the spring 103. This permits the spring to exert a force upon the pin 101 thereby urging the pin 101 forwardly. When the maximum pivotal movement of the bell-crank 104 is reached, the link 109 has been forced downwardly thereby releasing the latch 107 from the pin 101. The pin 101 snaps forwardly and stops the rotation of the dog 100. As the dog 100 is held from rotation, the clutch 96 is disengaged from the sprocket 97 and movement of the upper conveyer 62 and the feed roller 65 is halted. The lower conveyer 59 is free to continue its operation and the forward movement of the baling machine need not be halted. Hay is continuously gathered and conveyed to the teeth 66 of the feed roller 65, whereupon the hay starts gathering and thus forms a reservoir which may immediately be fed into the feeding mechanism when the previous bale has been discharged and the mechanism has returned to its initial position for repeating the baling cycle. In other words, the feed roller 65 during the formation of the bale assists in feeding material to the baling mechanism. When the bale has reached its predetermined size, however, the feed roller and the conveyer 62 cease operation whereby the roller acts to block the vegetation from being carried to the baling mechanism. The gear 94 and the chain 110 are continuously operating to drive the sprocket 111. Since the forward end of the lower tension arm 19 has been forced downwardly, the rod 117 is also forced downwardly and thereupon disengages the release member 116 from the dog 115 of the clutch 113. Release of the dog 115 actuates the clutch to rotate the cam 114 clockwise from the position indicated in Figure 5.

Rotation of the cam 114 causes the roller 119' to travel from the highest point on the cam to the lowest point thereof until the position shown in Figure 6 is reached. This movement causes the slide bar 118 to be moved downwardly as urged by the spring 121, thereupon forcing the end of the lever 120 upwardly. The lever 120 thereupon abuts the projection 46 and trips the trip lever 45. At this point the lower trip arm 41 and the upper trip arm 43 are free to rotate with respect to each other. Since the hanger members 26 have been moved rearwardly to the position shown in Figure 8, the springs 29 have become extended and are continuously urging the hanger arms 26 to the position shown in Figure 3, namely, the normal position. The relative free movement of the lower trip arms 41 and the upper trip arms 43 permits them to open, and the lower trip roller 18 moves to a forward position underneath the bale where it is held against further forward movement by means of the link 47. The upper trip roller 34 moves to a position above the bale, and since both rollers are now completely separated, the bale is free to be ejected onto the platform 72. The tensioning of the spring 37 causes the baling belts to resume their normal position indicated in Figure 3, and the bale is ejected. The trip rollers 18 and 34 again are brought into their adjacent position and the baling operation can be resumed.

As the bale drops upon the platform 72 it rolls to the position indicated in Figure 8, whereupon it actuates the trip arm 86 which starts the wrapping and tying mechanism into operation. The needle arms 84 carrying twine 91 wrap twine around the periphery of the bale. The tying or knotting mechanisms 92 are thereupon set into operation and the twine strands are securely tied to the bale. After the knots have been tied, the ends of the twine are cut off automatically by the cutter knives 94' in a well-known manner. When this has been accomplished, the discharge arms 79 are rotated in a clockwise manner, as best shown in Figure 10, through the slots 79' whereupon the arms 79 engage and discharge the tied bundle or bale to the ground. The detailed operation of this conventional wrapping, tying, cutting and discharge mechanism is described and disclosed in detail in the aforementioned patents to B. R. Benjamin.

It should now be understood that the objects of the invention have been completely accomplished since the complete cycle of operation from vegetation gathering to baling, subsequent wrapping, tying and discharge have been accomplished without a stopping of the lower conveyer 59 or the forward movement of the machine. A reservoir of hay is ever present which may immediately be fed into the baling mechanism upon release of a bale and since the complete operation is automatic it is unnecessary for the operator to leave the tractor.

It is obvious that various changes and/or modifications may be made in the construction and design above described without departing from the spirit of the invention nor the scope thereof as set forth in the appended claims.

What is claimed is:

1. In a baling machine having a baling mechanism for compressing and rolling detached vegetation into a cylindrical bale, means for driving said baling mechanism, pick-up means for continuously gathering vegetation during operation of said baling mechanism, means for feeding vegetation to said baling mechanism, mechanism operative to arrest the supply of gathered vegetation supplied to said feeding means in response to the formation of said bale to a predetermined diameter, means for discharging said formed bale from said baling mechanism, a wrapping and tying mechanism adjacent said baling mechanism, said mechanism including a receiving means for the formed bale, and trip means engageable by the formed bale for actuating said wrapping and tying mechanism to wrap and tie said bale with a binder material.

2. In a rotary baling machine having a mechanism for rolling fibrous material into a cylindrical bale, feeding means for feeding fibrous material to said mechanism and means for discharging the cylindrical bales, the combination with said baling machine of a material supply means including a pick-up roller, a first conveyer, a second conveyer positioned to receive material from said first conveyer and adapted to supply material to said feeding means, a feeding roller positioned for assisting the movement of material from said first conveyer to said second conveyer, means for driving said conveyers and said rollers, and means operably connected to the baling mechanism for stopping the operation of said feeding roller and said second conveyer upon formation of said bale to a predetermined size.

3. In a baling machine having a baling mechanism for compressing and rolling detached vegetation into a cylindrical bale, means for driving said baling mechanism, pick-up means for continuously gathering vegetation during operation of said baling mechanism, means for feeding vegetation to said baling mechanism, mechanism operative to arrest the supply of gathered vegetation supplied to said feeding means in response to the formation of said bale to a predetermined diameter, means for discharging said formed bale from said baling mechanism, means rendered operable upon discharge of said bale to effect wrapping of said bale with a binding material, means for knotting the said binding material, and means for cutting away the unused portion of said binding material and ejecting said bale from said machine.

4. In a baling machine having a baling mechanism for compressing and rolling detached vegetation into a cylindrical bale, means for driving said baling mechanism, means for feeding vegetation to said baling mechanism, tensionable means adapted to control the diameter and the density of the formation of said bale, and means for discharging said bale from said baling mechanism, the combination with said baling machine, of a vegetation gathering device comprising a pick-up roller, a first conveyer positioned to receive vegetation from said pick-up roller, a second conveyer for moving material to the vegetation feeding means of said baling mechanism, a supply means for supplying vegetation from said first conveyer to said second conveyer, means for arresting the operation of said second conveyer and said supply means, said means being operably connected to said tensionable means for actuation upon the attainment of a predetermined diameter of said bale, and trip means connected to said tensionable means and said discharge means, said trip means being operable to discharge said bale from said baling mechanism upon the cessation of operation of said second conveyer.

5. In a baling machine having a baling mechanism for compressing and rolling detached vegetation into a cylindrical bale, means for driving said baling mechanism, means for feeding vegetation to said baling mechanism, tensionable means adapted to control the diameter and the density of the formation of said bale, and means for discharging said bale from said baling mechanism, the combination with said baling machine, of a vegetation gathering device comprising a pick-up roller, a first conveyer positioned to receive vegetation from said pick-up roller, a second conveyer for moving material to the vegetation feeding means of said baling mechanism, a supply means for supplying vegetation from said first conveyer to said second conveyer, and means for arresting the operation of said second conveyer and said supply means, said arresting means being operably connected to said tensionable means for actuation upon the attainment of a predetermined diameter of said bale.

6. In a rotary baling machine having a mechanism for rolling detached vegetation into a cylindrical bale, means for feeding vegetation to said baling mechanism, tensionable means for controlling the diameter of said bale, release means connected to said tensionable means and operable to discharge said bale upon the attainment of said bale to a predetermined diameter, and means for operating said baling mechanism, the combination with said baling machine, of a vegetation gathering and feed means for supplying vegetation to said baling mechanism, said vegetation gathering and feed means comprising a pick-up roller, a first conveyer for receiving detached vegetation from said pick-up roller, a second conveyer positioned to receive vegetation from said first conveyer and to move the same to said vegetation feeding means of said mechanism, a feed roller operable to move vegetation, drive means for operating said conveyers, pick-up roller and feed roller, mechanism operable from said tensionable means to disengage said feed roller and said second conveyer from said drive means upon the attainment of said bale to a predetermined diameter, said non-operating feed roller and said non-operating second conveyer providing means for retaining the continuously gathering vegetation from said baling mechanism, and means operable to reengage said drive means with said feed roller and said second conveyer upon discharge of said bale.

7. In a rotary baling machine having a mechanism for rolling detached vegetation into a cylindrical bale, means for feeding detached vegetation to said baling mechanism, means operable to discharge the formed bale upon the attainment of said bale to a predetermined diameter, and means for driving said baling machine, the combination with said baling machine of wrapping and tying means comprising, a platform positioned to receive the discharged bale, a wrapping means positioned on said platform, trip means operable upon association with said bale to actuate said wrapping means to wrap said bale with a binding material, a knotting means operable by said wrapping means to tie said binding material around said bale, means for cutting the unused binding material from the used binding material, and means operable with said knotting mechanism for ejecting said tied bale from said platform.

8. A rotary baler having a baling mechanism for rolling detached vegetation into a cylindrical bale comprising, a feeding means for delivering vegetation to the baling mechanism, a pick-up means for gathering vegetation and delivering the same to the feeding means, feed blocking means between the feeding means and the baling mechanism, said feed blocking means being intermittently operable to block movement of the vegetation to the baling mechanism whereby a reservoir for vegetation is provided adjacent said blocking means, and means connected to the feed blocking means and the baling mechanism, said last named means being arranged to operate the blocking means in response to operation of the baling mechanism during a predetermined cycle of operation of said mechanism.

9. In a baling machine having a baling mechanism for rolling detached vegetation into a cylindrical bale, and discharge means for discharging the bale from said baling mechanism, the combination with said baling mechanism of a feeding device for feeding detached vegetation to said baling mechanism, said feeding device including a pick-up means for gathering detached vegetation, a blocking means for blocking the feeding of vegetation to said baling mechanism, said blocking mechanism being intermittently operable to block the feeding whereby a reservoir of vegetation is accumulated adjacent the blocking means, and means connected to the feed blocking means and to the discharge mechanism, said means being arranged to actuate the blocking means in response to the operation of the discharge means during a predetermined cycle of operation of said baling mechanism.

10. A rotary baler having a baling mechanism for rolling detached vegetation into a cylindrical bale comprising a feeding means for gathering and feeding vegetation to the baling mechanism, a discharge mechanism for discharging the bale from said baling mechanism, a feed blocking and feed moving device positioned between the baling mechanism and the feeding means, said device being operable alternately to move vegetation to the baling mechanism and to block the movement of vegetation to said baling mechanism, and means connected to said device and to the baling mechansm, said means being arranged to actuate said device to alternately block and move vegetation during operation of said mechanism.

11. A rotary baler having a baling mechanism for rolling detached vegetation into a cylindrical bale comprising a feeding means for gathering and feeding vegetation to the baling mechanism, a discharge mechanism for discharging the bale from said baling mechanism, a feed blocking and feed moving device positioned between the baling mechanism and the feeding means, said device being operable alternately to move vegetation to the baling mechanism and to block the movement of vegetation to said baling mechanism, and means connected to said device and to the discharge mechanism, said means being arranged to actuate said device to block the feeding of vegetation to the baling mechanism during operation of said discharging mechanism, and to actuate said device to move said vegetation to the baling mechanism during formation of the bale.

12. In a baling machine having a baling mechanism for compressing and rolling detached vegetation into a cylindrical bale, means for operating said baling mechanism, a discharge mechanism operable to discharge a formed bale from said baling mechanism upon the formation of said bale to a predetermined diameter, a platform for receiving the discharged bale, a bale wrapping and tying means associated with said platform, and trip means associated with said platform, said trip means being adapted to be engaged by said bale and to actuate said wrapping and tying means to wrap and tie said bale with a binding material, and means for ejecting said tied bale from said baling machine.

13. In a rotary baling machine having a baling mechanism for rolling material into a cylindrical bale, the combination with said baling machine of a material supply means including a first conveyer, a first drive means for driving said conveyer, pick up means for supplying material to the first conveyer, a second conveyer longitudinally spaced with respect to said first conveyer and adapted to receive material from the first conveyer, a second drive means connected to said second conveyer and to said baling mechanism for moving said second conveyer, disengageable means connected to said second drive means and to said baling mechanism, said disengageable means being operable to disconnect the second drive means from said second conveyer upon formation of said bale to a predetermined size whereby operation of said second conveyer is halted, and means connected to said first drive means for operating said drive means and said first conveyer during the inoperative position of said second conveyer.

14. In a baling machine of a type adapted to be moved through a field of cut vegetation, said machine having a wheeled frame, a baling mechanism supported on said frame for rolling cut vegetation into a cylindrical bale, and a discharge mechanism for discharging the formed bales, the combination with said baling mechanism of a conveyer adapted to feed vegetation toward and into said baling mechanism, drive means connected to said conveyer to operate said conveyer whereby material is discharged from one end of said conveyer, blocking means disposed adjacent said conveyer and adapted to block the movement of material to the baling mechanism during a predetermined cycle of operation of said baling mechanism, and means connecting said blocking means to said baling mechanism, said means being operable to actuate said blocking means upon the formation of a bale to a predetermined diameter.

HEINZ KOLZING.

REFERENCES CITED

The following references are of record in the file of this patent:

UNITED STATES PATENTS

| Number | Name | Date |
| --- | --- | --- |
| 1,919,897 | MacGregor et al. | July 25, 1933 |
| 2,205,278 | Russell | June 18, 1940 |
| 2,336,491 | Luebben | Dec. 14, 1943 |
| 2,410,159 | Harrer et al. | Oct. 29, 1946 |
| 2,424,821 | Harrer | July 29, 1947 |